US012715214B2

(12) United States Patent
Fujimura et al.

(10) Patent No.: US 12,715,214 B2
(45) Date of Patent: Aug. 25, 2026

(54) LIQUID DISCHARGE HEAD AND LIQUID DISCHARGE APPARATUS

(71) Applicants: Yuki Fujimura, Kanagawa (JP); Keishi Miwa, Kanagawa (JP)

(72) Inventors: Yuki Fujimura, Kanagawa (JP); Keishi Miwa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 165 days.

(21) Appl. No.: 18/669,563

(22) Filed: May 21, 2024

(65) Prior Publication Data

US 2024/0399745 A1 Dec. 5, 2024

(30) Foreign Application Priority Data

May 30, 2023 (JP) ................................ 2023-088837

(51) Int. Cl.
*B41J 2/14* (2006.01)

(52) U.S. Cl.
CPC .. *B41J 2/14233* (2013.01); *B41J 2002/14258* (2013.01)

(58) Field of Classification Search
CPC .......... B41J 2/14233; B41J 2002/14258; B41J 2/161; B41J 2/1628; B41J 2/1629; B41J 2/1632; B41J 2/1642; B41J 2/1646; B41J 2002/14362; B41J 2002/14419;
(Continued)

(56) References Cited

U.S. PATENT DOCUMENTS

| | | | |
|---|---|---|---|
| 2016/0001556 A1 | 1/2016 | Masuda et al. | |
| 2017/0100934 A1 | 4/2017 | Masuda et al. | |
| 2019/0275796 A1 | 9/2019 | Miwa | |

(Continued)

FOREIGN PATENT DOCUMENTS

| | | | |
|---|---|---|---|
| JP | 2000-326503 A | | 11/2000 |
| JP | 2016155283 A | * | 6/2016 |

OTHER PUBLICATIONS

English machine translation of Masahiro et al. (JP 2016155283 A) (Year: 2016).*
U.S. Appl. No. 18/499,661, filed Nov. 1, 2023.

*Primary Examiner* — Ricardo I Magallanes
*Assistant Examiner* — Natasha Dephenia Quinn
(74) *Attorney, Agent, or Firm* — XSENSUS LLP

(57) ABSTRACT

A liquid discharge head includes a nozzle plate, a liquid chamber substrate, a diaphragm plate, and a piezoelectric element. The nozzle plate has multiple nozzle holes from each of which a liquid is dischargeable in a discharge direction. The multiple nozzle holes are arrayed in an array direction. The liquid chamber substrate has a first face on the nozzle plate, multiple liquid chambers respectively communicating with the multiple nozzle holes, multiple chamber region in which the multiple liquid chambers are respectively disposed, and a non-chamber region outside the multiple chamber region. The diaphragm plate is disposed on a second face of the liquid chamber substrate. The piezoelectric element includes a first electrode over the diaphragm plate, a piezoelectric body on the first electrode, and a second electrode on the piezoelectric body. The first electrode has patterned openings disposed between adjacent liquid chambers in the array direction in the non-chamber region.

18 Claims, 7 Drawing Sheets

(58) Field of Classification Search
CPC .......... B41J 2202/11; B41J 2002/14491; B41J 2/1623; B41J 2/1631
See application file for complete search history.

(56) References Cited

U.S. PATENT DOCUMENTS

| | | | | |
|---|---|---|---|---|
| 2020/0298569 | A1* | 9/2020 | Miwa | B41J 2/14201 |
| 2020/0298570 | A1 | 9/2020 | Masuda et al. | |
| 2021/0016568 | A1 | 1/2021 | Miwa | |
| 2021/0036208 | A1 | 2/2021 | Shimofuku et al. | |
| 2021/0162759 | A1 | 6/2021 | Miwa et al. | |
| 2021/0370675 | A1 | 12/2021 | Yoshita et al. | |
| 2023/0106664 | A1 | 4/2023 | Miwa | |
| 2023/0130058 | A1 | 4/2023 | Miwa | |
| 2023/0139963 | A1 | 5/2023 | Miwa | |
| 2023/0147417 | A1 | 5/2023 | Fujimura et al. | |
| 2023/0249461 | A1 | 8/2023 | Matsuda et al. | |
| 2023/0294403 | A1 | 9/2023 | Nagahashi et al. | |
| 2023/0330990 | A1 | 10/2023 | Fujimura et al. | |
| 2024/0092081 | A1 | 3/2024 | Miwa et al. | |
| 2024/0109317 | A1 | 4/2024 | Fujimura et al. | |

* cited by examiner

FIG. 1
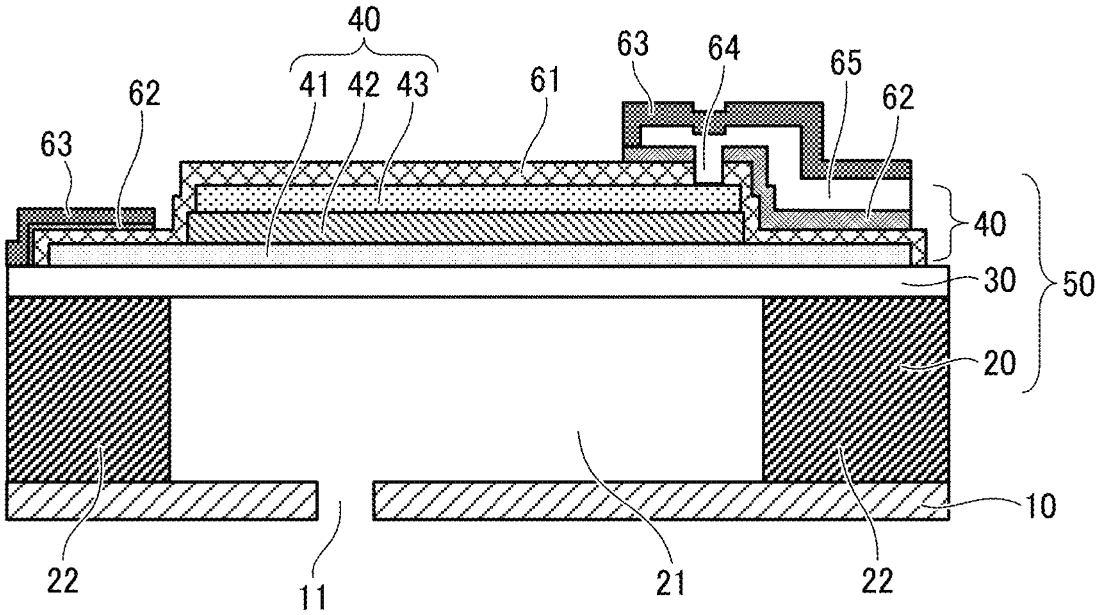
FIG. 2 COMPARATIVE EXAMPLE
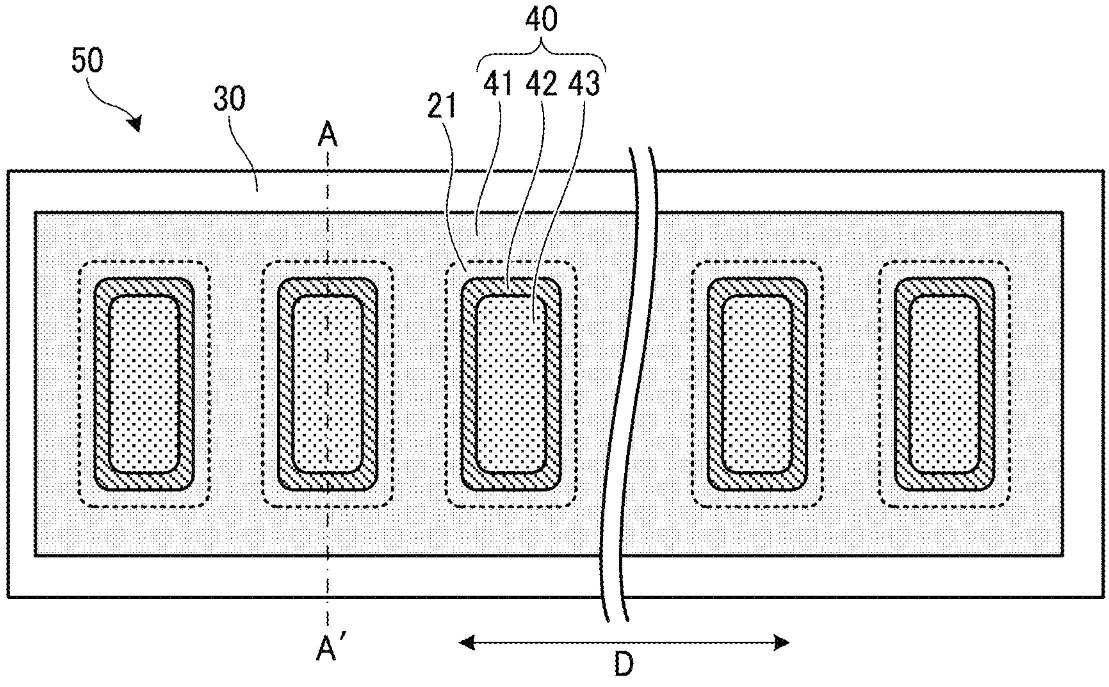

FIG. 7A
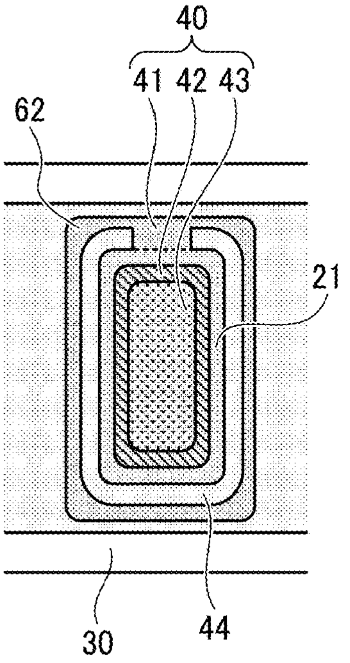
FIG. 7B
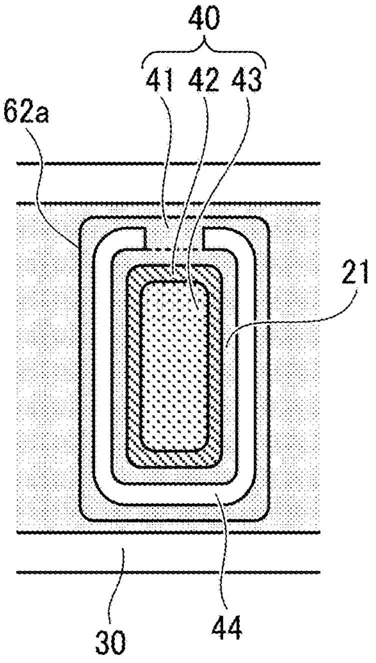
FIG. 8 COMPARATIVE EXAMPLE
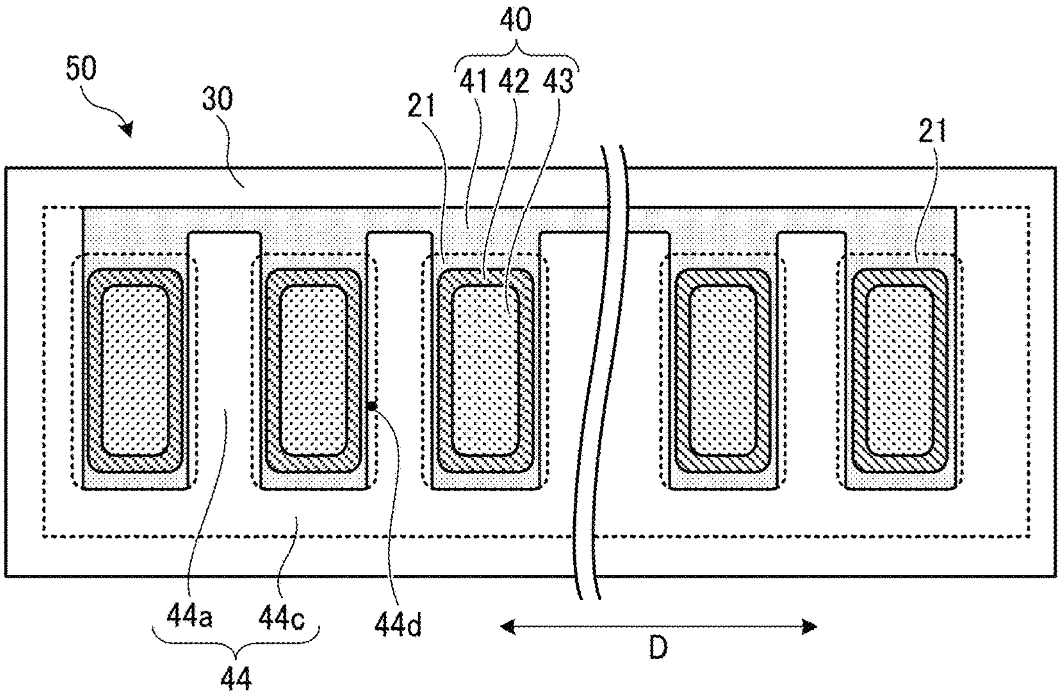

LIQUID DISCHARGE HEAD AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2023-088837, filed on May 30, 2023, in the Japan Patent Office, the entire disclosure of which is hereby incorporated by reference herein.

BACKGROUND

Technical Field

Embodiments of the present disclosure relate to a liquid discharge head and a liquid discharge apparatus.

Related Art

As a liquid discharge apparatus, for example, an inkjet recording apparatus includes a liquid discharge head that discharges a liquid such as ink. The liquid discharge head includes a nozzle to discharge a liquid, a liquid chamber (may be referred to as, for example, a pressure chamber) that communicates with the nozzle and stores the liquid, and an energy generator such as a piezoelectric element. In the liquid discharge head, the piezoelectric element to which a voltage is applied vibrates so as to deform (displace) a diaphragm plate forming a part of a wall of the liquid chamber. The liquid in the liquid chamber is pressurized by the deformation (displacement) of the diaphragm plate, and thus the liquid is discharged from the nozzle.

In the liquid discharge head, a piezoelectric actuator has been put into practical use. The piezoelectric actuator includes a lower electrode, a piezoelectric body, and an upper electrode which are laminated on the diaphragm plate to form a piezoelectric element. A semiconductor device manufacturing technique to which micro electro mechanical systems (MEMS) is applied is used to manufacture such a liquid discharge head. In the manufacturing using the MEMS, patterning is performed by processes such as resist pattern formation by photolithography, etching, and resist peeling by a chemical solution to form an actuator substrate in which the layers of the lower electrode, the piezoelectric body, and the upper electrode are laminated and formed in desired patterns on the diaphragm plate.

SUMMARY

Embodiments of the present disclosure describe an improved liquid discharge head that includes a nozzle plate, a liquid chamber substrate, a diaphragm plate, and a piezoelectric element. The nozzle plate has multiple nozzle holes from each of which a liquid is dischargeable in a discharge direction. The multiple nozzle holes are arrayed in an array direction orthogonal to the discharge direction. The liquid chamber substrate has a first face on the nozzle plate, multiple liquid chambers respectively communicating with the multiple nozzle holes, multiple chamber region in which the multiple liquid chambers are respectively disposed, and a non-chamber region outside the multiple chamber region. The diaphragm plate is disposed on a second face opposite the first face of the liquid chamber substrate. The piezoelectric element includes a first electrode over the diaphragm plate, a piezoelectric body on the first electrode to deform the diaphragm plate, and a second electrode on the piezoelectric body. The first electrode has patterned openings each disposed between adjacent liquid chambers of the multiple liquid chambers in the array direction in the non-chamber region.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 is a schematic cross-sectional view of a part of a liquid discharge head in the longitudinal direction of a liquid chamber, according to an embodiment of the present disclosure;

FIG. 2 is a schematic plan view of an actuator substrate of a liquid discharge head according to a comparative example;

FIGS. 7A and 7B are schematic plan views of an actuator substrate of a liquid discharge head according to an embodiment of the present disclosure;

FIG. 8 is a schematic plan view of an actuator substrate of a liquid discharge head according to a comparative example;

Figure 3:
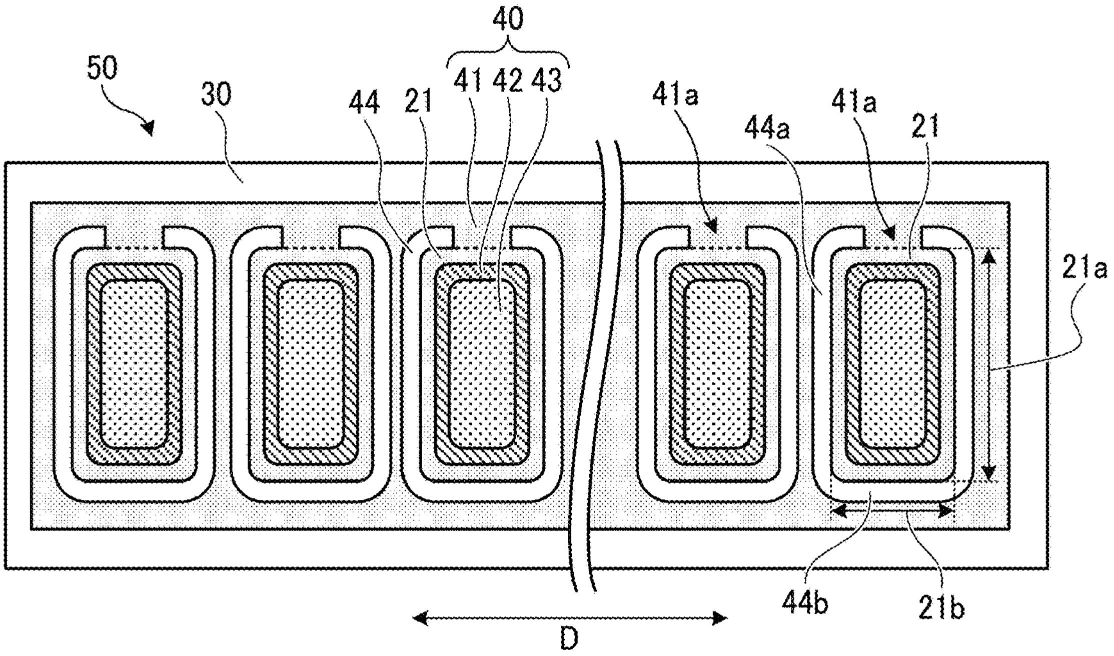
FIG. 3 is a schematic plan view of an actuator substrate of a liquid discharge head according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A liquid discharge head and a liquid discharge apparatus according to embodiments of the present disclosure are described below with reference to the drawings. Embodiments of the present disclosure are not limited to the embodiments described below and may be other embodiments than the embodiments described below. The following embodiments may be modified by, for example, addition, modification, or omission within the scope that would be obvious to one skilled in the art. Any aspects having advantages as described for the following embodiments according to the present disclosure are included within the scope of the present disclosure.

FIG. 1 is a schematic cross-sectional view of a liquid discharge head, to which embodiments of the present disclosure are applicable, in the longitudinal direction of a liquid chamber. FIG. 2 is a schematic plan view of an actuator substrate according to a comparative example. FIG. 1 illustrates a cross section of the liquid discharge head taken along line A-A' in FIG. 2.

The liquid discharge head includes a nozzle plate 10 in which nozzle holes 11 for discharging a liquid are formed, and an actuator substrate 50 as a piezoelectric actuator. The actuator substrate 50 includes a liquid chamber substrate 20, a diaphragm plate 30, and a piezoelectric element 40. The liquid chamber substrate 20 has multiple liquid chambers 21 communicating with the nozzle holes 11. The piezoelectric element 40 as a pressure generator pressurizes the liquid in the liquid chambers 21. Each of the multiple liquid chambers 21 is partitioned by partition walls 22.

The positions of the liquid chambers 21 are indicated by broken lines in FIG. 2. The piezoelectric element 40 includes a first electrode 41 (may be referred to as a "lower electrode" in the following description), a piezoelectric body 42, and a second electrode 43 (may be referred to as an "upper electrode" in the following description), which are laminated in this order over the diaphragm plate 30.

Multiple piezoelectric bodies 42 and multiple upper electrodes 43 are formed corresponding to the multiple liquid chambers, respectively. The lower electrode 41 may be a common electrode and the upper electrode 43 may be an individual electrode. Alternatively, the lower electrode 41 may be the individual electrode, and the upper electrode 43 may be the common electrode.

As illustrated in FIG. 1, the liquid discharge head includes a first insulating protective film 61 (may be referred to simply as a "protective film") that covers the piezoelectric element 40, a second insulating protective film 62 (may be referred to as an "interlayer insulating film"), and a third insulating protective film 63 (may be referred to as a "passivation film").

A contact hole 64 is formed in the interlayer insulating film 62. The upper electrode 43 is connected to a wiring 65 through the contact hole 64, and is connected to a terminal electrode for external connection through the wiring 65. The upper electrode 43 is connected to the wiring 65 on the short side of the liquid chamber 21. The lower electrode 41 is connected to a wiring through a contact hole formed in the protective film 61, and is connected to a terminal electrode for external connection through the wiring.

The piezoelectric element 40 to which a drive voltage is applied via the wiring 65 vibrates so as to deform the diaphragm plate 30 between the liquid chamber substrate 20 and the piezoelectric element 40, and the liquid in the liquid chamber 21 is pressurized by the deformation of the diaphragm plate 30. As a result, the liquid can be discharged from the nozzle hole 11. The lower electrode 41 has a function of applying a voltage to the piezoelectric body 42, and is typically formed of a metal material such as platinum (Pt).

Preferably, the piezoelectric actuator substrate has sufficiently high adhesiveness between the layers to be laminated. However, when a lower electrode made of a metal or a metal oxide film is laminated on a diaphragm plate made of a silicon oxide film, good adhesiveness between the diaphragm plate and the lower electrode may not be obtained. Accordingly, the lower electrode 41 may peel off due to the poor adhesiveness to the diaphragm plate 30 made of, for example, a silicon oxide film.

If the adhesiveness to the diaphragm plate is not sufficient, for example, film peeling or film floating (may be referred to simply as "peeling") may occur at the edge (corner) of the pattern in the patterning process of the lower electrode, causing a decrease in yield. In addition, if the adhesiveness between the diaphragm plate and the lower electrode is insufficient, when the piezoelectric body is deformed by application of a voltage, the lower electrode having a large pattern and a large internal stress may peel off. Further, the lower electrode peeling off may adhere to an unintended portion of the piezoelectric actuator, causing, for example, a short circuit, which leads to a decrease in the product reliability of the liquid discharge head.

When a resist is peeled by a chemical solution in patterning at the corners of the square pattern of the lower electrode 41 as illustrated in FIG. 2, the chemical solution may attack the outer peripheral portion of the lower electrode 41, and the lower electrode 41 may peel off at the interface with an adhesive layer. On the other hand, the lower electrode 41 having a shape that can reduce stress or has high chemical resistance, which is formed by patterning, is prevented from peeling off.

For example, in a comparative example, a lower electrode is provided on an area facing a liquid chamber (pressure generating chamber) via an insulating layer. At least both ends of the lower electrode in a width direction thereof are positioned within the area facing the liquid chamber. However, when an area where the lower electrode 41 is not formed is present in the area facing the liquid chamber 21, the diaphragm plate 30 becomes thin due to the influence of etching of the lower electrode 41. Accordingly, the film thickness of the diaphragm plate 30 forming the liquid chamber 21 may vary.

When lead zirconate titanate (PZT) is used as the material of the piezoelectric body 42, lead (Pb) diffuses in the area where the lower electrode 41 is not formed. Accordingly, the rigidity of the diaphragm plate 30 may vary. By contrast, in the liquid discharge head according to the present embodiment, the lower electrode 41 has an opening 44 (i.e., patterned openings) disposed only in the area facing the area where the liquid chamber 21 is not formed (i.e., a non-chamber region), and thus the lower electrode 41 is prevented from peeling off without variations in the film thickness and rigidity of the diaphragm plate 30. A mask pattern used for etching the lower electrode 41 is appropriately changed to obtain a desired opening shape, and the lower electrode 41 in an area to be the opening 44 is removed to form the opening 44.

The area of the liquid chamber substrate 20 facing the area where the liquid chamber 21 is not formed corresponds to the peripheral portion of the piezoelectric body 42 disposed corresponding to the liquid chamber 21. The opening 44 formed by patterning in the peripheral portion of the piezoelectric body 42 which is deformed by application of a voltage can reduce (alleviate) stress on the lower electrode 41. Accordingly, the lower electrode 41 can be prevented from peeling off.

Further, an adhesive film may be disposed between the lower electrode 41 and the diaphragm plate 30 to enhance the adhesiveness. The adhesive film is not limited to a particular material as long as the material can enhance the adhesiveness between the lower electrode 41 and the diaphragm plate 30, and examples thereof include a titanium oxide film and a titanium film. The adhesive film may be thick enough not to hinder the vibration of the diaphragm plate 30. For example, the adhesive film preferably has a film thickness of about 30 nm.

Figure 4:
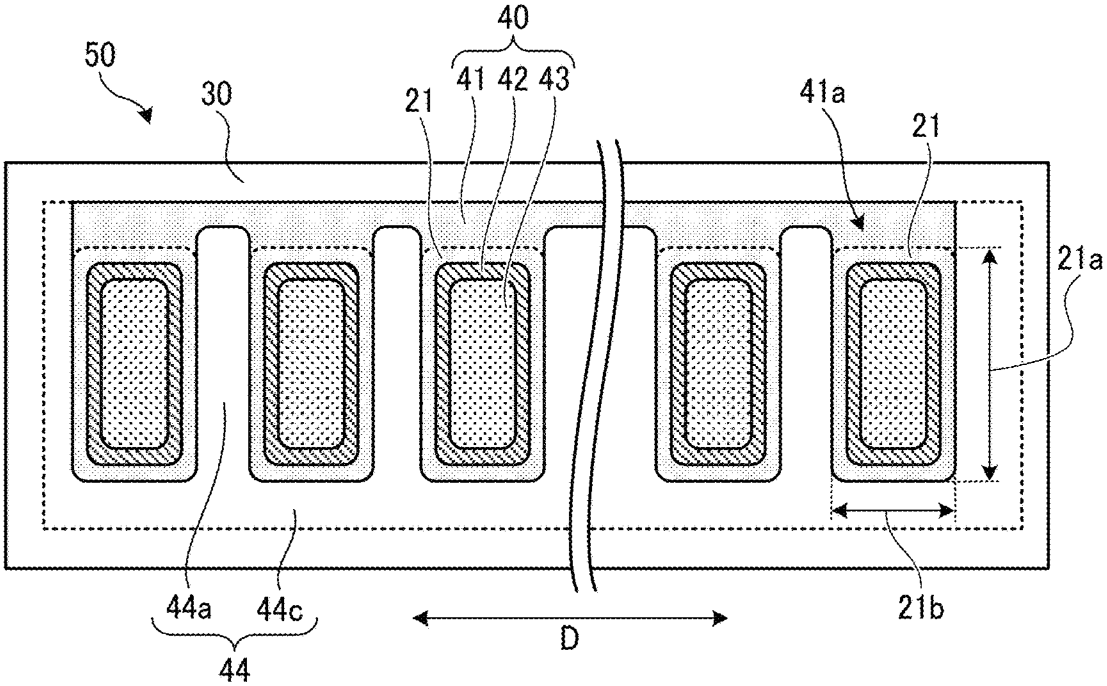
FIG. 4 is a schematic plan view of an actuator substrate of a liquid discharge head according to an embodiment of the present disclosure.
Figure 5:
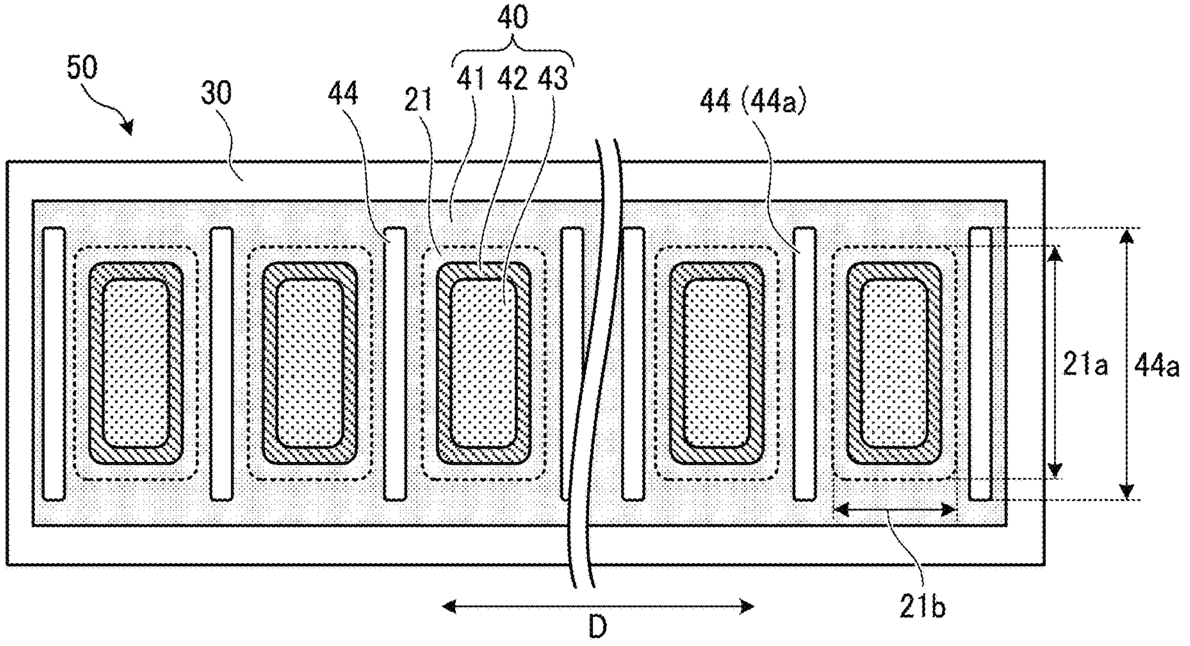
FIG. 5 is a schematic plan view of an actuator substrate of a liquid discharge head according to an embodiment of the present disclosure.

FIGS. 3 to 5 are schematic plan views of the actuator substrate 50 of the liquid discharge head according to the present embodiment.

The liquid discharge head according to the present embodiment includes a liquid chamber substrate 20 in which multiple liquid chambers 21 communicating with nozzle holes 11 for discharging a liquid are formed, a diaphragm plate 30 disposed on a face of the liquid chamber substrate 20 facing the nozzle holes 11, and a piezoelectric element 40 in which a first electrode (lower electrode) 41, a piezoelectric body 42, and a second electrode (upper electrode) 43 are laminated in this order on the diaphragm plate 30. The piezoelectric body 42 vibrates to deform (displace) the diaphragm plate 30 to discharge the liquid from the nozzle holes 11. The first electrode (lower electrode) 41 has an opening 44 in a region opposed to a region where the liquid chambers 21 of the liquid chamber substrate 20 are not formed, and the opening 44 is disposed in a region between the liquid chambers 21 adjacent to each other at least in an array direction D of the liquid chambers 21.

Specifically, the liquid discharge head includes n liquid chambers 21 (n is a natural number of 2 or more), n piezoelectric bodies 42 corresponding to the n liquid chambers 21, and n second electrodes (upper electrodes) 43 corresponding to the n liquid chambers 21. The opening 44 of the first electrode (lower electrode) 41 is disposed in a region between an n-th liquid chamber 21 and an (n−1)-th liquid chamber 21 in the array direction D of the n liquid chambers 21.

In the array direction D of the liquid chambers 21, the openings 44 may be formed on both sides of an arbitrary n-th liquid chamber 21, or the opening 44 may be formed on only one side of the n-th liquid chamber 21.

In the present embodiment, the first electrode (lower electrode) 41 is the common electrode, and the second electrode (upper electrode) 43 is the individual electrode, but embodiments of the present disclosure are not limited thereto. Alternatively, the first electrode (lower electrode) 41 may be the individual electrode, and the second electrode (upper electrode) 43 may be the common electrode.

First Embodiment

FIG. 5 is a schematic plan view of an actuator substrate 50 included in the liquid discharge head according to a first embodiment of the present disclosure. The positions of the liquid chambers 21 are indicated by broken lines in FIG. 5.

The actuator substrate 50 of the liquid discharge head according to the present embodiment has the liquid chamber 21 having a substantially rectangular shape in plan view. The liquid chamber 21 has short sides 21*b* extending in the array direction D, and the opening 44 of the lower electrode 41 has a slit 44*a* parallel to at least long sides 21*a* of the liquid chamber 21. The slit 44*a* parallel to the long sides 21*a* of the liquid chamber 21 is longer than the long sides 21*a* of the liquid chamber 21. Such a configuration reduces the stress on the lower electrode 41 at least in the longitudinal direction around the piezoelectric body 42 that vibrates, and can prevent the lower electrode 41 from peeling off.

Second Embodiment

FIG. 3 is a schematic plan view of an actuator substrate 50 included in the liquid discharge head according to a second embodiment of the present disclosure. The positions of the liquid chambers 21 are indicated by broken lines in FIG. 3.

The actuator substrate 50 of the liquid discharge head according to the present embodiment has the liquid chamber 21 having a substantially rectangular shape in plan view. The liquid chamber 21 has short sides 21*b* extending in the array direction D. The opening 44 has a substantially U-shape in which a pair of slits 44*a* parallel to the long sides 21*a* of the liquid chamber 21 are connected to a slit 44*b* parallel to one of the short sides 21*b* of the liquid chamber 21.

A portion 41*a* of the lower electrode 41 where the opening 44 is not formed is a region overlapping with a region where the wiring is formed in plan view. The opening 44 is formed by patterning in the region of the liquid chamber substrate 20 other than the portion 41*a*, in the region where the liquid chamber 21 is not formed, and in the region of the peripheral portion of the piezoelectric body 42. The opening 44 formed in such a region can reduce (alleviate) stress on the lower electrode 41. Accordingly, the lower electrode 41 can be prevented from peeling off.

The opening 44 having the substantially U-shape as illustrated in FIG. 3 can reduce a voltage drop due to the opening 44. In the liquid discharge head according to the present embodiment, the liquid chamber 21 and the piezoelectric body 42 have rounded corners in plan view, and the opening 44 formed around the liquid chamber 21 and the piezoelectric body 42 also has rounded corners.

Third Embodiment

FIG. 4 is a schematic plan view of an actuator substrate 50 included in the liquid discharge head according to a third embodiment of the present disclosure. The positions of the liquid chambers 21 are indicated by broken lines in FIG. 4. The edge of the lower electrode 41 before removal is also indicated by a broken line.

The actuator substrate 50 of the liquid discharge head according to the present embodiment has the liquid chamber 21 having a substantially rectangular shape in plan view. The liquid chamber 21 has short sides 21*b* extending in the array direction D. The opening 44 has a substantially a comb shape in which multiple slits 44*a* parallel to the long sides 21*a* of the liquid chamber 21 are connected to an opening portion 44*c* disposed on one side of one of the short sides 21*b* of the liquid chamber 21.

A portion 41*a* of the lower electrode 41 where the opening 44 is not formed is a region overlapping with a region where the wiring is formed in plan view. The opening 44 is formed by patterning in the region where the liquid chamber 21 is not formed, except for the portion 41*a*. The opening 44 formed in such a region can reduce (alleviate) stress on the lower electrode 41. Accordingly, the lower electrode 41 can be prevented from peeling off.

The first to third embodiments have been described above, but the shape of the opening 44 is not limited thereto, and the opening 44 is disposed in a region opposed to a region of the liquid chamber substrate 20 where the liquid chamber 21 is not formed, and at least in a region between the liquid chambers 21 adjacent to each other in the array direction D of the liquid chambers 21.

FIGS. 6A to 7B are schematic plan views of a part of the actuator substrate 50 (a part corresponding to one liquid chamber 21) according to the second embodiment, illustrating an example of the coating by the interlayer insulating film 62. The liquid discharge head according to the present embodiment includes the interlayer insulating film 62 that insulates and separates the first electrode (lower electrode) 41 and the second electrode (upper electrode) 43, and at least a part of the edge of the opening 44 of the first electrode (lower electrode) 41 is coated with the interlayer insulating film 62.

Figure 6A:
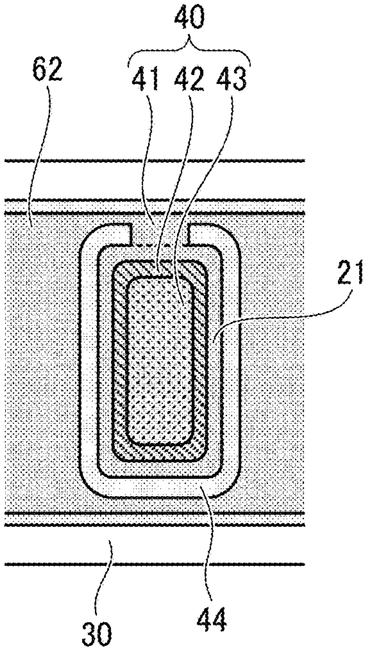
FIGS. 6A and 6B are schematic plan views of an actuator substrate of a liquid discharge head according to an embodiment of the present disclosure.
Figure 6B:
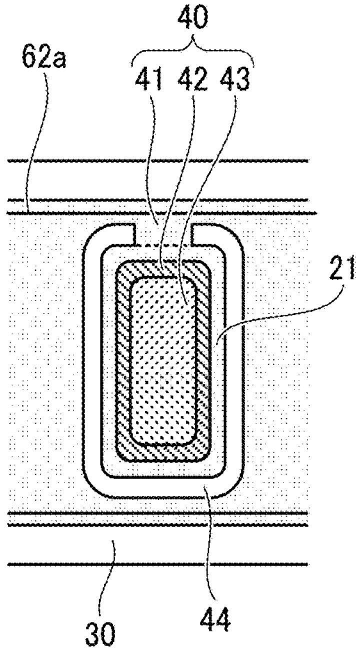

FIGS. 6A and 6B illustrate the interlayer insulating film 62 that widely covers the region of the lower electrode 41 where the opening 44 is formed and where the opening 44 is not formed. FIG. 6A is a transparent plan view of the part of the actuator substrate 50 coated with the interlayer insulating film 62, and FIG. 6B is a plan view of the part of the actuator substrate 50 coated with the interlayer insulating film 62, only an edge 62*a* of which is illustrated in FIG. 6B. The interlayer insulating film 62 that covers substantially the entire lower electrode 41 can reduce process damage to the edge portion during etching of the lower electrode 41. Accordingly, the lower electrode 41 can be more reliably prevented from peeling off.

FIGS. 7A and 7B illustrate the interlayer insulating film 62 that locally covers the region of the lower electrode 41 where the opening 44 is formed and where the opening 44 is not formed. FIG. 7A is a transparent plan view of the part of the actuator substrate 50 coated with the interlayer insulating film 62, and FIG. 7B is a plan view of the part of the actuator substrate 50 coated with the interlayer insulating film 62, only the edge 62*a* of which is illustrated in FIG. 7B.

When the interlayer insulating film 62 is a compressive stress film, the compressive stress can be reduced even by the local coating as illustrated in FIG. 7. Accordingly, the lower electrode 41 can be more reliably prevented from peeling off.

The interlayer insulating film 62 preferably covers at least a part of the edge of the lower electrode 41. The edge of the lower electrode 41 includes an outer perimetrical edge and an edge around the opening 44. The interlayer insulating film 62 covering the edge of the lower electrode 41 can prevent the lower electrode 41 from peeling off at the interface.

Although the interlayer insulating film 62 may cover the entire edge of the lower electrode 41, when the stress difference between the interlayer insulating film 62 and the lower electrode 41 is large, the interlayer insulating film 62 covering only a part of the edge of the lower electrode 41 can prevent the peeling-off of the lower electrode 41 due to the stress difference between the films.

A voltage of a high PULL waveform (36 V, 120 kHz) was applied to the actuator substrate 50 of the liquid discharge head according to the present embodiment to drive the liquid discharge head trillion times, and the actuator substrate 50 was evaluated. As a result of evaluation, the actuator substrate 50 was not damaged after driving, and had sufficient durability. In addition, the lower electrode 41 did not peel off in the observation after driving, and the variations in the film thickness and the variations in the rigidity of the diaphragm plate 30 were not observed from the discharge potential and the displacement distribution of the diaphragm plate 30.

First Comparative Example

As a first comparative example, a liquid discharge head including the actuator substrate 50 illustrated in FIG. 2 was evaluated. The comparative actuator substrate 50 of FIG. 2 does not have the opening 44 in the lower electrode 41.

The voltage of the high PULL waveform (36 V, 120 kHz) was applied to the actuator substrate 50 of the liquid discharge head according to the first comparative example to drive the liquid discharge head trillion times, and the actuator substrate 50 was evaluated. As a result of evaluation, the lower electrode 41 has peeled off.

Second Comparative Example

As a second comparative example, a liquid discharge head including the actuator substrate 50 illustrated in FIG. 8 was evaluated.

Similarly to the actuator substrate 50 of the liquid discharge head according to the third embodiment described above, the actuator substrate 50 of FIG. 8 has the opening 44 having a comb shape in which multiple slits 44*a* parallel to the long sides 21*a* of the liquid chamber 21 are connected to an opening portion 44*c* disposed on one side of one of the short sides 21*b* of the liquid chamber 21. In addition, the opening 44 is also formed in a region (i.e., an opening portion 44*d*) opposed to the region where the liquid chamber 21 is formed (i.e., a chamber region).

In the actuator substrate 50 according to the second comparative example, the opening 44 of the lower electrode 41 is also formed over the liquid chamber 21. Accordingly, the film thickness of the diaphragm plate 30 was reduced at the portion corresponding to the opening portion 44*d*. As a result, the thickness of the diaphragm plate 30 varied. In addition, the rigidity of the diaphragm plate 30 also varied.

As described above, the opening 44 of the lower electrode 41 in the region opposed to the region where the liquid chamber 21 of the liquid chamber substrate 20 is not formed and at least in the region between the adjacent liquid chambers 21 can prevent the lower electrode 41 from peeling off, and can reduce the variations in the film thickness and the variations in the rigidity of the diaphragm plate 30 forming the liquid chamber 21.

According to the present embodiment, a liquid discharge head can be obtained that prevents the lower electrode from peeling off, can be manufactured with a high yield, and has high reliability.

A method of manufacturing the actuator substrate of the liquid discharge head according to the present embodiment will be described below.

First, the diaphragm plate 30 is formed on the liquid chamber substrate 20. As the liquid chamber substrate 20, for example, a silicon wafer having a film thickness of 625 μm is used. The diaphragm plate 30 is formed of a desired composition such as a thermal oxide film and a silicon oxide film, a silicon nitride film, or a polysilicon film formed by, for example, chemical vapor deposition (CVD). Subsequently, the piezoelectric element 40 is formed over the diaphragm plate 30. The lower electrode 41, a PZT film as the piezoelectric body 42, and the upper electrode 43 are sequentially formed in this order to form the piezoelectric element 40.

Preferably, the adhesive film is disposed between the lower electrode 41 and the diaphragm plate 30. As the adhesive film, for example, a titanium oxide film is used. The titanium oxide film can be formed by, for example, forming a titanium film (film thickness of 30 nm) by a sputtering apparatus and then performing thermal oxidation at 750° C. by rapid thermal annealing (RTA).

The lower electrode 41 is formed by depositing a platinum film (film thickness of 100 nm) as a metal film and forming a titanium oxide film on the platinum film. A titanium film is formed on the platinum film by sputtering, and then the titanium film is thermally oxidized by RTA to form a titanium oxide film. The film thickness of the titanium oxide film is preferably 30 to 70 Å.

The piezoelectric body 42 is formed by forming the PZT film to a desired thickness by a sol-gel method. The upper electrode 43 is formed by forming a strontium ruthenium oxide ($SrRuO_3$) film (film thickness of 20 nm) as an oxide film and a Pt film (film thickness of 100 nm) as a metal film by sputtering.

Then, a photoresist is formed by spin coating, and a resist pattern is formed by photolithography. After that, the piezoelectric body 42 and the upper electrode 43 are divided by etching using an etching apparatus to form individual patterns thereof. A resist pattern is formed by photolithography, and a pattern of the lower electrode 41 is formed by etching. Patterning is performed so that the opening 44 having a desired shape is formed.

An aluminum oxide ($Al_2O_3$) film is formed as the first insulating protective film (protective film) 61 by atomic layer deposition (ALD). The protective film 61 functions as a barrier layer that protects the piezoelectric element 40 from process damage such as hydrogen. The protective film 61 preferably has a film thickness that has sufficient barrier property as a barrier layer and can maintain the function of the piezoelectric element 40 as an actuator. For example, the film thickness of the protective film 61 is preferably 500 Å or more.

Subsequently, a silicon nitride (SiN) film is formed as the second insulating protective film (interlayer insulating film) 62. By using the SiN film as the interlayer insulating film 62, a second protective film can be further formed on the portion of the protective film 61 covering the side wall face of the piezoelectric element 40 without a new process. In photolithography and etching of post-processes, an etching process is performed with the side wall face of the piezoelectric element 40 masked by a resist to cause the SiN film to remain on the portion of the protective film 61 covering the side wall face of the piezoelectric element 40 so as to prevent the protective film 61 from being over-etched.

The interlayer insulating film 62 has a thickness of 200 nm or more in consideration of, for example, the surface properties of the base and pinholes, and preferably has a thickness of 500 nm or more. Then, contact hole 64 is formed by etching. An aluminum (Al) film is formed by sputtering, and the formed Al film is etched to form the pattern of the wiring 65.

Subsequently, a SiN film is formed as the third insulating protective film (passivation film) 63. The third insulating protective film (passivation film) 63 is formed to a thickness of 1000 nm by, for example, plasma CVD. A through hole serving as a liquid supply port is formed in the diaphragm plate 30 by etching.

The liquid chamber 21 is formed by polishing or etching the liquid chamber substrate 20 to a desired thickness, coating the partition wall with a resist, and performing anisotropic wet etching with an alkaline solution. The liquid chamber 21 may be formed by dry etching using an inductively coupled plasma (ICP) etcher instead of anisotropic etching using an alkaline solution.

The actuator substrate 50 is formed by the above-described processes. The nozzle plate 10 in which the nozzle holes 11 are opened at positions corresponding to the pressure chambers 21 is bonded to the actuator substrate 50 to form a liquid discharge head.

Head Module

A head module including the liquid discharge head according to the above-described embodiments will be described with reference to FIGS. 9 and 10. The head module includes at least one liquid discharge head (may be appropriately referred to as a "head") attached to a cover and a base.

Figure 9:
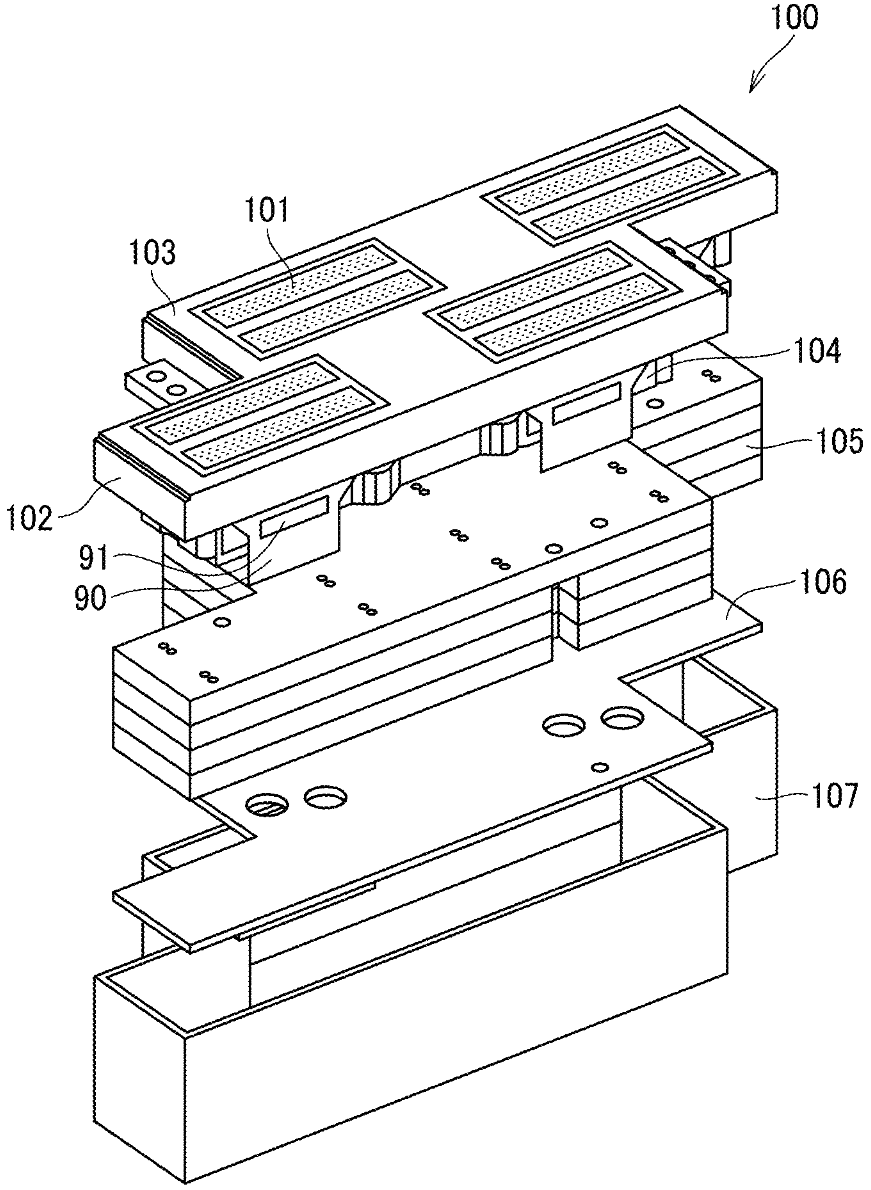
FIG. 9 is an exploded perspective view of a head module including liquid discharge heads according to an embodiment of the present disclosure.
Figure 10:
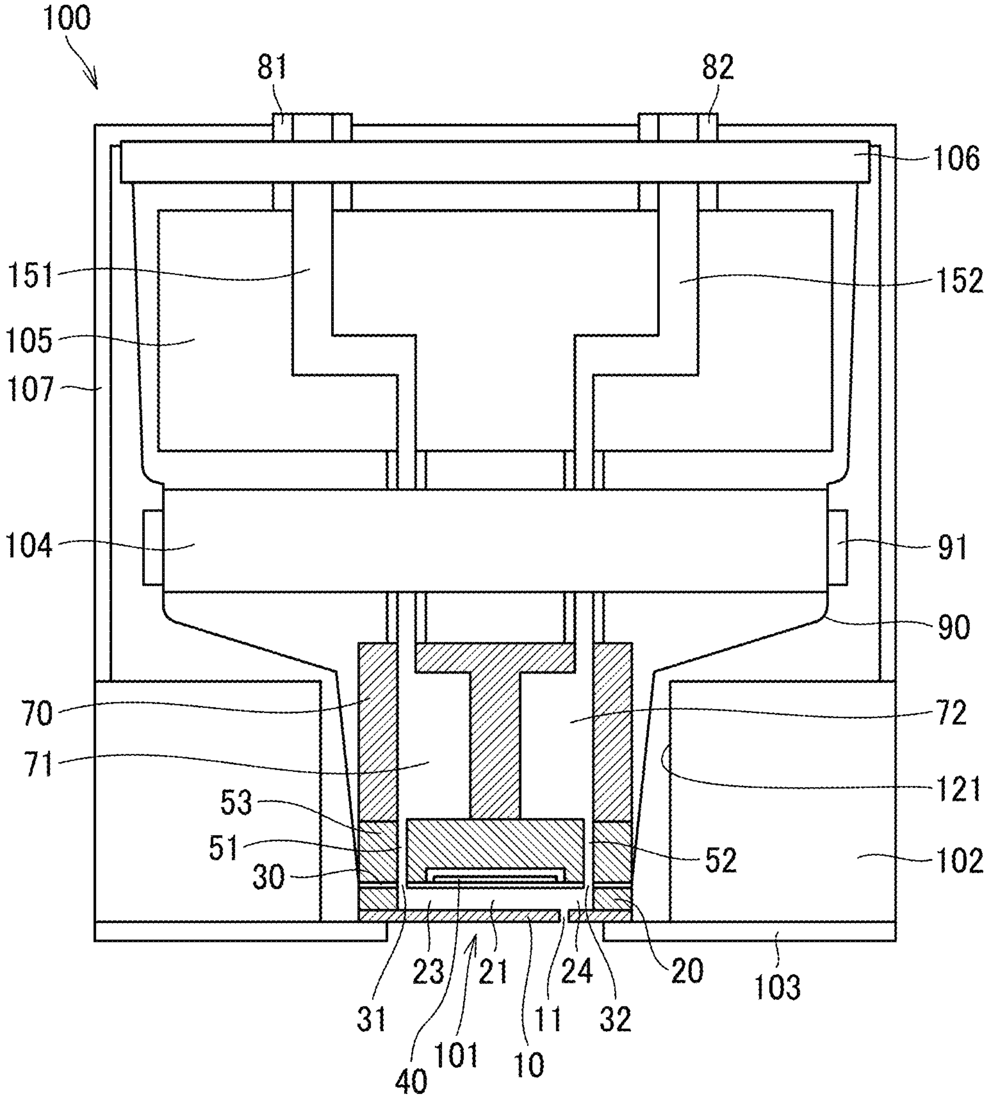
FIG. 10 is a cross-sectional view of a head module including a liquid discharge head according to an embodiment of the present disclosure.

FIG. 9 is an exploded perspective view of the head module, and FIG. 10 is a cross-sectional view of one head of the head module in the transverse direction of the head. A head module 100 includes multiple heads 101 to discharge a liquid, a base 102, a cover 103, a heat radiator 104, a manifold 105, a printed circuit board (PCB) 106, and a module case 107.

The head 101 includes the nozzle plate 10, the liquid chamber substrate (channel substrate) 20, and the diaphragm plate 30. The nozzle hole 11 is formed in the nozzle plate 10. The liquid chamber substrate 20 defines an individual channel such as the liquid chamber (pressure chamber) 21 communicating with the nozzle hole 11. The diaphragm plate 30 includes the piezoelectric element 40 as a driver that pressurizes the liquid in the liquid chamber 21. The head 101 includes a holding substrate 53 laminated on the diaphragm plate 30, and a common channel substrate 70 laminated on the holding substrate 53. The common channel substrate 70 is a frame of one head 101.

The liquid chamber substrate 20 defines an individual supply channel 23 communicating with the liquid chamber 21 and an individual collection channel 24 communicating with the liquid chamber 21 in addition to the liquid chamber 21.

The holding substrate 53 defines an intermediate supply channel 51 and an intermediate collection channel 52. The intermediate supply channel 51 communicates with the individual supply channel 23 via a diaphragm-plate opening 31 of the diaphragm plate 30. The intermediate collection channel 52 communicates with the individual collection channel 24 via a diaphragm-plate opening 32 of the diaphragm plate 30.

The common channel substrate 70 defines a common supply channel 71 communicating with the intermediate supply channel 51 and a common collection channel 72 communicating with the intermediate collection channel 52. The common supply channel 71 communicates with a supply port 81 via a channel 151 of the manifold 105. The common collection channel 72 communicates with a collection port 82 via a channel 152 of the manifold 105. The PCB 106 and the piezoelectric element 40 are connected to each other via a flexible wiring 90, and a driver integrated circuit (IC) 91 is mounted on the flexible wiring 90.

Each of the multiple heads 101 is inserted into a base opening 121 of the base 102, and the cover 103 bonded and fixed to the base 102 is bonded to the liquid chamber substrate 20 of the head 101 with an adhesive to fix the head 101. The cover 103 has an opening corresponding to the region of the nozzle holes 11 of the nozzle plate 10, and the cover 103 covers the peripheral edge of the nozzle plate 10 of the head 101.

The base 102 is a component disposed across a space from the side wall face of the liquid chamber substrate 20, and a part of the flexible wiring 90 is disposed in the space. A flange disposed outside the common channel substrate 70 in the longitudinal direction of the head 101 is bonded and fixed to the base 102.

Liquid Discharge Apparatus

Figure 11:
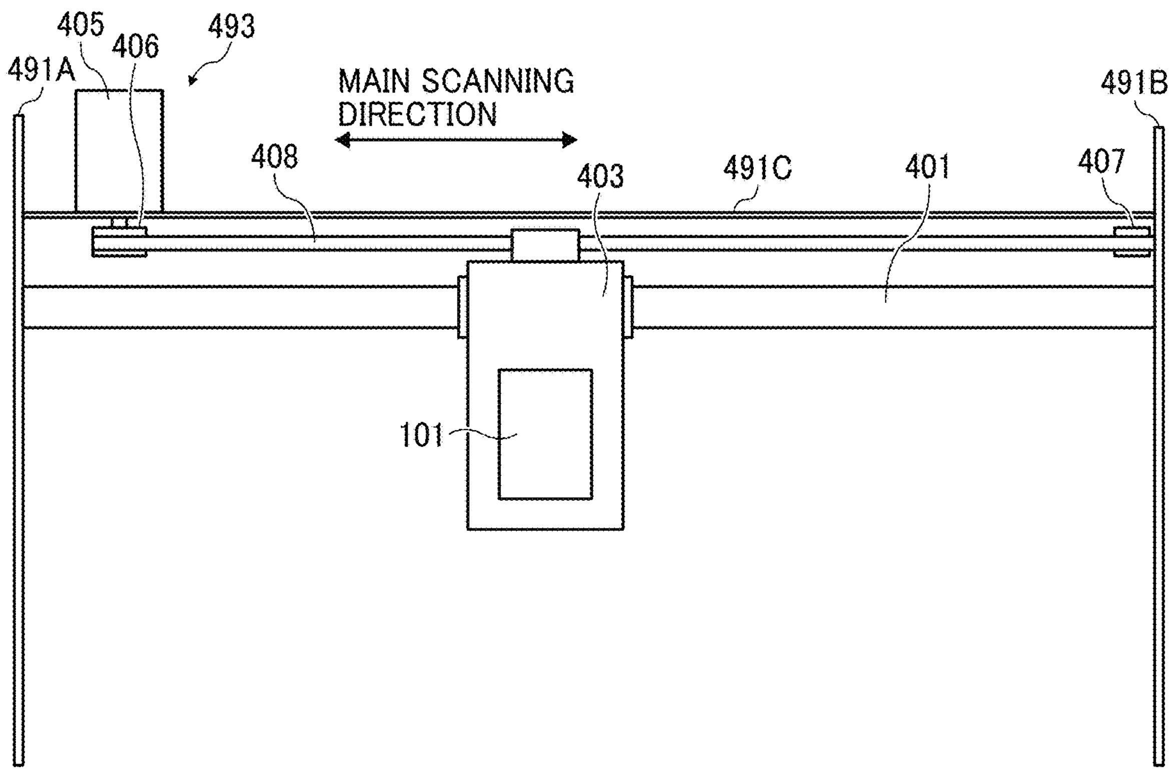
FIG. 11 is a schematic plan view of a part of a liquid discharge apparatus according to an embodiment of the present disclosure.
Figure 12:
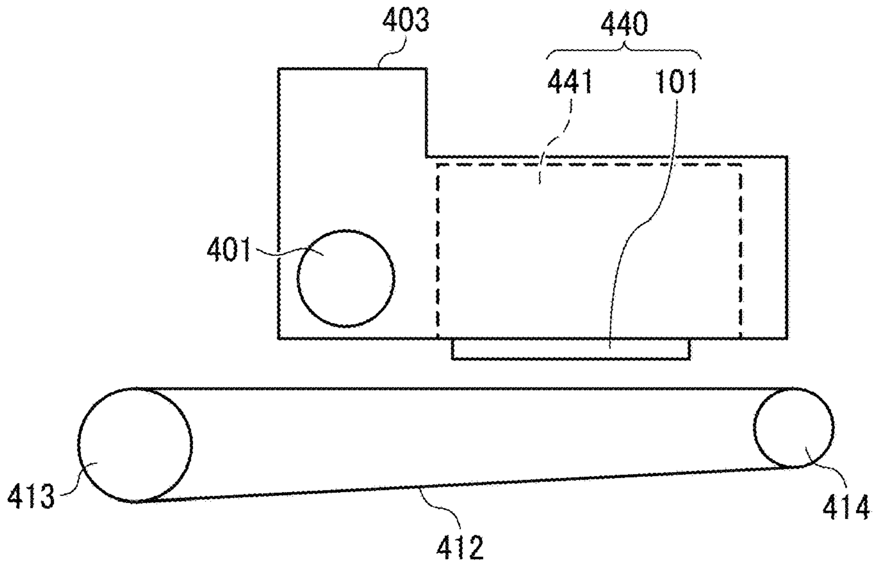
FIG. 12 is a schematic side view of a part of a liquid discharge apparatus according to an embodiment of the present disclosure.

An example of a liquid discharge apparatus including the liquid discharge head according to the above-described embodiments is described below with reference to FIGS. 11 and 12. FIG. 11 is a plan view of a part of the liquid discharge apparatus, and FIG. 12 is a side view of the part of the liquid discharge apparatus. FIGS. 11 and 12 illustrate a serial inkjet recording apparatus as an example of the liquid discharge apparatus.

A main-scanning moving mechanism 493 reciprocates a carriage 403 on which a liquid discharge head 101 is mounted in a main scanning direction. The main-scanning moving mechanism 493 includes, for example, a guide 401, a main-scanning motor 405, and a timing belt 408. The guide 401 is bridged between left and right side plates 491A and 491B to movably hold the carriage 403. The main-scanning motor 405 reciprocates the carriage 403 in the main scanning direction via the timing belt 408 looped around a drive pulley 406 and a driven pulley 407.

The carriage 403 includes a liquid discharge unit 440 in which the liquid discharge head 101 and a head tank 441 are integrated as a single unit. The liquid discharge head 101 of the liquid discharge unit 440 discharges color liquid of, for example, yellow (Y), cyan (C), magenta (M), or black (K). The liquid discharge head 101 includes a nozzle row in which the multiple nozzle holes 11 are arrayed in the sub-scanning direction orthogonal to the main scanning direction. The liquid discharge head 101 discharges the color liquid downward from the nozzle holes 11.

The liquid discharge apparatus further includes a conveyance mechanism to convey a recording medium such as a sheet to a position facing the liquid discharge head 101. The conveyance mechanism includes a conveyance belt 412 (i.e., a conveyor) and a sub-scanning motor to drive the conveyance belt 412. The conveyance belt 412 is an endless belt looped around a conveyance roller 413 and a tension roller 414.

The main-scanning moving mechanism 493 and the conveyance mechanism are mounted onto a housing including the side plates 491A and 491B and a back plate 491C. The liquid discharge head 101 is driven in response to image signals while the carriage 403 moves in the main scanning direction to discharge liquid to the recording medium, thus forming an image on the recording medium.

Liquid to be discharged from the liquid discharge head 101 is not limited to a particular liquid as long as the liquid has a viscosity or surface tension to be discharged from the liquid discharge head 101. However, preferably, the viscosity of the liquid is not greater than 30 millipascal-second (mPa s) under ordinary temperature and ordinary pressure or by heating or cooling. Examples of the material to be discharged include a solution, a suspension, or an emulsion including, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

The "liquid discharge apparatus" may be, for example, any apparatus that can discharge liquid to a medium onto which liquid can adhere or any apparatus to discharge liquid toward gas or into a different liquid.

The "liquid discharge apparatus" may further include devices relating to feeding, conveying, and ejecting of the medium onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers, so as to form a three-dimensional object.

The "liquid discharge apparatus" is not limited to an apparatus that discharges liquid to visualize meaningful images such as letters or figures. For example, the liquid discharge apparatus may be an apparatus that forms patterns having no meaning or an apparatus that fabricates three-dimensional images.

The above-described term "medium onto which liquid can adhere" represents a medium on which liquid is at least temporarily adhered, a medium on which liquid is adhered and fixed, or a medium into which liquid adheres and permeates. Specific examples of the "medium onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "medium onto which liquid can adhere" includes any medium to which liquid adheres, unless otherwise specified.

Examples of materials of the "medium onto which liquid can adhere" include any materials to which liquid can adhere even temporarily, such as paper, thread, fiber, fabric, leather, metal, plastic, glass, wood, and ceramic.

The liquid discharge apparatus may be an apparatus to move the liquid discharge head and the medium onto which liquid can adhere relative to each other. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

The terms "image formation," "recording," "printing," "image printing," and "fabricating" used herein may be used synonymously with each other.

Aspects of the present disclosure are, for example, as follows.

Aspect 1

A liquid discharge head includes a liquid chamber substrate in which multiple liquid chambers communicating with nozzle holes for discharging a liquid are formed, a diaphragm plate disposed on a face of the liquid chamber substrate facing the nozzle holes, and a piezoelectric element in which a first electrode, a piezoelectric body, and a second electrode are laminated in this order on the diaphragm plate.

The piezoelectric body vibrates to deform (displace) the diaphragm plate to discharge the liquid from the nozzle holes. The first electrode has an opening in a region opposed to a region where the liquid chambers of the liquid chamber substrate are not formed, and the opening is disposed in a region between the liquid chambers adjacent to each other at least in an array direction of the liquid chambers.

In other words, a liquid discharge head includes a nozzle plate, a liquid chamber substrate, a diaphragm plate, and a piezoelectric element. The nozzle plate has multiple nozzle holes from each of which a liquid is dischargeable in a discharge direction. The multiple nozzle holes are arrayed in an array direction orthogonal to the discharge direction. The liquid chamber substrate has a first face on the nozzle plate, multiple liquid chambers respectively communicating with the multiple nozzle holes, multiple chamber region in which the multiple liquid chambers are respectively disposed, and a non-chamber region outside the multiple chamber region. The diaphragm plate is disposed on a second face opposite the first face of the liquid chamber substrate. The piezoelectric element includes a first electrode over the diaphragm plate, a piezoelectric body on the first electrode to deform the diaphragm plate, and a second electrode on the piezoelectric body. The first electrode has patterned openings each disposed between adjacent liquid chambers of the multiple liquid chambers in the array direction in the non-chamber region.

Aspect 2

In the liquid discharge head according to Aspect 1, the liquid chamber has a substantially rectangular shape having short sides in the array direction in plan view, and the opening has a slit parallel to at least long sides of the liquid chamber.

In other words, each of the multiple liquid chambers has a rectangular shape in a plane of the liquid chamber substrate. Each of the multiple liquid chambers has short sides extending in the array direction and long sides extending in a transverse direction orthogonal to the array direction and the discharge direction. The patterned openings include slits extending in the transverse direction parallel to the long sides of the multiple liquid chambers.

Aspect 3

In the liquid discharge head according to Aspect 2, a length of the slit parallel to the long sides of the liquid chamber is longer than a length of the long sides of the liquid chamber.

In other words, the slits are longer than the long sides of the multiple liquid chambers.

Aspect 4

In the liquid discharge head according to Aspect 1, the liquid chamber has a substantially rectangular shape having short sides in the array direction in plan view, and the opening has a substantially U-shape in which a pair of slits parallel to the long sides of the liquid chamber and a slit parallel to one of the short sides of the liquid chambers are connected.

In other words, each of the multiple liquid chambers has a rectangular shape in a plane of the liquid chamber substrate. Each of the multiple liquid chambers has short sides extending in the array direction and long sides extending in a transverse direction orthogonal to the array direction and the discharge direction. Each of the patterned openings includes a pair of slits sandwiching one of the multiple liquid chambers and extending in the transverse direction parallel to the long sides, and a slit extending in the array direction parallel to the short sides and connecting the pair of the slits to form a U-shape.

Aspect 5

In the liquid discharge head according to Aspect 1, the liquid chamber has a substantially rectangular shape having short sides in the array direction in plan view, and the opening has a comb shape in which multiple slits parallel to the long sides of the liquid chamber and an opening disposed on one side of the short sides of the liquid chamber are connected.

In other words, each of the multiple liquid chambers has a rectangular shape in a plane of the liquid chamber substrate. Each of the multiple liquid chambers has short sides extending in the array direction and long sides extending in a transverse direction orthogonal to the array direction and the discharge direction. The patterned openings include multiple slits extending in the transverse direction parallel to the long sides and an opening portion disposed on one side of one of the short sides and connecting each of the multiple slits to form a comb shape. Each of the multiple slits is disposed between a pair of the multiple liquid chambers.

Aspect 6

The liquid discharge head according to any one of Aspects 1 to 5, further includes an interlayer insulating film to insulate and separate the first electrode and the second electrode. At least a part of an edge of the opening of the first electrode is covered with the interlayer insulating film.

In other words, the liquid discharge head according to any one of Aspects 1 to 5, further includes an interlayer insulating film insulating the first electrode from the second electrode. A part of an edge of the patterned openings of the first electrode is covered with the interlayer insulating film.

Aspect 7

In the liquid discharge head according to Aspect 6, at least a part of an edge of the first electrode is covered with the interlayer insulating film.

In other words, a part of an edge of the first electrode is covered with the interlayer insulating film.

Aspect 8

The liquid discharge head according to any one of Aspects 1 to 7, further includes an adhesive film between the diaphragm plate and the first electrode. The adhesive film is a titanium oxide film.

In other words, the liquid discharge head according to any one of Aspects 1 to 7, further includes an adhesive film including a titanium oxide film disposed between the diaphragm plate and the first electrode.

Aspect 9

In the liquid discharge head according to any one of Aspects 1 to 8, the opening of the first electrode has a rounded corner.

In other words, each of the patterned openings of the first electrode has a rounded corner.

Aspect 10

A liquid discharge apparatus includes the liquid discharge head according to any one of Aspects 1 to 9.

In other words, a liquid discharge apparatus includes the liquid discharge head according to any one of Aspects 1 to 9, to discharge the liquid to a recording medium and a conveyor to convey the recording medium to a position facing the liquid discharge head.

As described above, according to one aspect of the present disclosure, a liquid discharge head can be provided that prevents the lower electrode from peeling off, can be manufactured with a high yield, and has high reliability.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:
a nozzle plate including multiple nozzle holes from each of which a liquid is dischargeable in a discharge direction, the multiple nozzle holes arrayed in an array direction orthogonal to the discharge direction;
a liquid chamber substrate including:
a first face on the nozzle plate;
multiple liquid chambers respectively communicating with the multiple nozzle holes;
multiple chamber region in which the multiple liquid chambers are respectively disposed; and
a non-chamber region outside the multiple chamber region;
a diaphragm plate on a second face opposite the first face of the liquid chamber substrate; and
a piezoelectric element including:
a first electrode over the diaphragm plate, the first electrode having patterned openings each disposed between adjacent liquid chambers of the multiple liquid chambers in the array direction in the non-chamber region;
a piezoelectric body on the first electrode to deform the diaphragm plate; and
a second electrode on the piezoelectric body,
wherein:
each of the multiple liquid chambers has a rectangular shape in a plane of the liquid chamber substrate, and each of the multiple liquid chambers has:
short sides extending in the array direction; and
long sides extending in a transverse direction orthogonal to the array direction and the discharge direction,
each of the patterned openings includes:
a pair of slits sandwiching one of the multiple liquid chambers and extending in the transverse direction parallel to the long sides, and
a slit extending in the array direction parallel to the short sides and connecting the pair of the slits to form a U-shape.

2. The liquid discharge head according to claim 1, wherein:
the slits are longer than the long sides of the multiple liquid chambers.

3. A liquid discharge head, comprising:
a nozzle plate including multiple nozzle holes from each of which a liquid is dischargeable in a discharge direction, the multiple nozzle holes arrayed in an array direction orthogonal to the discharge direction;
a liquid chamber substrate including:
a first face on the nozzle plate;
multiple liquid chambers respectively communicating with the multiple nozzle holes;
multiple chamber region in which the multiple liquid chambers are respectively disposed; and
a non-chamber region outside the multiple chamber region;
a diaphragm plate on a second face opposite the first face of the liquid chamber substrate; and
a piezoelectric element including:
a first electrode over the diaphragm plate, the first electrode having patterned openings each disposed between adjacent liquid chambers of the multiple liquid chambers in the array direction in the non-chamber region;
a piezoelectric body on the first electrode to deform the diaphragm plate; and
a second electrode on the piezoelectric body,
wherein:
each of the multiple liquid chambers has a rectangular shape in a plane of the liquid chamber substrate, and each of the multiple liquid chambers has:
short sides extending in the array direction; and
long sides extending in a transverse direction orthogonal to the array direction and the discharge direction,
the patterned openings include:
multiple slits extending in the transverse direction parallel to the long sides, each of the multiple slits disposed between a pair of the multiple liquid chambers; and
an opening portion disposed on one side of the short sides and connecting each of the multiple slits to form a comb shape.

4. The liquid discharge head according to claim 1, further comprising:
an interlayer insulating film insulating the first electrode from the second electrode,
wherein a part of an edge of the patterned openings of the first electrode is covered with the interlayer insulating film.

5. The liquid discharge head according to claim 4, wherein:
a part of an edge of the first electrode is covered with the interlayer insulating film.

6. The liquid discharge head according to claim 1, further comprising:
an adhesive film including a titanium oxide film disposed between the diaphragm plate and the first electrode.

7. The liquid discharge head according to claim 1, wherein;
each of the patterned openings of the first electrode has a rounded corner.

8. A liquid discharge apparatus comprising:
the liquid discharge head according to claim 1, to discharge the liquid to a recording medium; and
a conveyor to convey the recording medium to a position facing the liquid discharge head.

9. The liquid discharge head according to claim 1, wherein:
the first electrode is a common electrode and the second electrode is an individual electrode.

10. The liquid discharge head according to claim 1, further comprising:

an adhesive film including a titanium film disposed between the diaphragm plate and the first electrode.

11. The liquid discharge head according to claim 3, wherein:

the slits are longer than the long sides of the multiple liquid chambers.

12. The liquid discharge head according to claim 3, further comprising:

an interlayer insulating film insulating the first electrode from the second electrode, wherein a part of an edge of the patterned openings of the first electrode is covered with the interlayer insulating film.

13. The liquid discharge head according to claim 12, wherein:

a part of an edge of the first electrode is covered with the interlayer insulating film.

14. The liquid discharge head according to claim 3, further comprising:

an adhesive film including a titanium oxide film disposed between the diaphragm plate and the first electrode.

15. The liquid discharge head according to claim 3, wherein:

each of the patterned openings of the first electrode has a rounded corner.

16. A liquid discharge apparatus comprising:

the liquid discharge head according to claim 3, to discharge the liquid to a recording medium; and a conveyor to convey the recording medium to a position facing the liquid discharge head.

17. The liquid discharge head according to claim 3, wherein:

the first electrode is a common electrode and the second electrode is an individual electrode.

18. The liquid discharge head according to claim 3, further comprising:

an adhesive film including a titanium film disposed between the diaphragm plate and the first electrode.

* * * * *